A. HEMME.
EARTH CUTTING BLADE.
APPLICATION FILED OCT. 12, 1916.

1,233,574.

Patented July 17, 1917.

INVENTOR.
AUGUST. HEMME.

UNITED STATES PATENT OFFICE.

AUGUST HEMME, OF DUBLIN, ONTARIO, CANADA.

EARTH-CUTTING BLADE.

1,233,574. Specification of Letters Patent. Patented July 17, 1917.

Application filed October 12, 1916. Serial No. 125,248.

*To all whom it may concern:*

Be it known that I, AUGUST HEMME, of the village of Dublin, in the county of Perth, in the Province of Ontario, Canada, have invented certain new and useful Improvements in Earth-Cutting Blades, of which the following is the specification.

My invention relates to improvements in earth cutting blades for scoops, and the object of the invention is to devise a cutting bar for the scoop which will easily and effectually cut a slice of earth off the ground without any danger of clogging or being obstructed as the earth passes thereover and it consists essentially of the following arrangement and construction of parts as hereinafter more particularly explained by the following specification.

In the drawings like figures of reference indicate corresponding parts in each figure.

1 indicates a scoop. 2 indicates an axle which extends through the side boards 3 of the scoop. 4 indicates the carrying wheels. 5 indicates the main frame swung at the rear end upon the axle 2. 6 indicates a bracket provided with a quadrant 7 carried by the frame 5. 8 indicates a lifting lever and 9 indicates a link connecting the lifting lever with the free end of the scoop.

It will, of course, be understood that the scoop as above described is only one form of scoop which may be employed and is only described for the purpose of illustration of the cutting bar, which forms the subject matter of my invention, and which may be applied to any form of scoop desired, or carried by any suitable device to perform its function.

Figure 1:
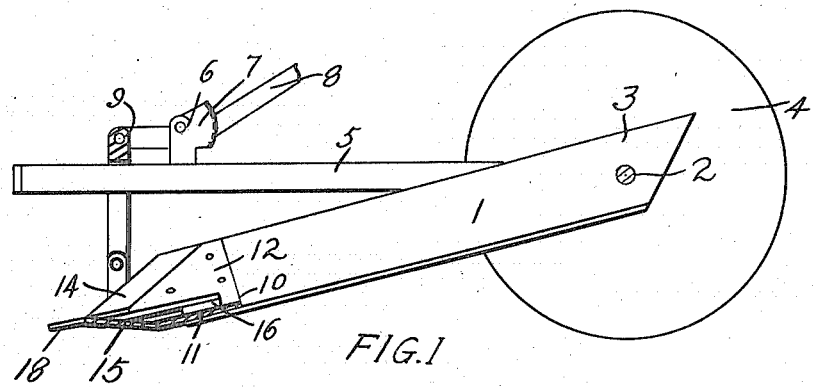
Figure 1, is a longitudinal section through the scoop.
Figure 2:
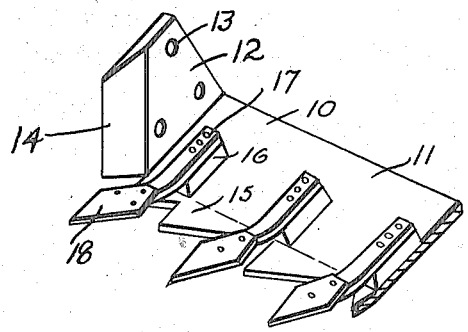
Fig. 2, is a perspective detail of a portion of the cutting bar.

10 indicates the cutting bar which comprises a plate 11 having up-turned ends 12 provided with orifices 13 through which bolts pass to secure the plate 11 to the side boards of the scoop 1. The up-turned portions 12 of the plate 11 are provided with inclined cutting edges 14. The plate 11 is set at an incline, the forward edge being provided with knife sections 15 extending substantially in a horizontal plane. 16 indicates blocks secured to the plate 11 intermediately between each pair of sections 15. 17 indicate bars secured to the blocks 16 and extending downwardly between the knife sections 15 as clearly shown in Fig. 1. 18 indicate supplemental knife sections which are secured to the lower ends of the bars 17 and extend in advance of the knife sections 15. The knife sections 18 and the blades 10 lie in forwardly converging planes and the sections 18 are located above the blades 10. By this means the earth is first cut by the knife sections 18 and as the earth is carried back it is engaged by the sections 15 which complete the cutting operation so as to cut a strip or layer of earth off the surface of the ground and pass it rearwardly on to the scoop as the scoop passes forwardly, the knife edges 14 serving to cut the edges of the strip away from the body of the earth so that it will pass freely on to the scoop.

What I claim as my invention is:

1. An earth cutting blade comprising an inclined cutting bar, knife sections forming the lower edge of the cutting bar and extending outwardly therefrom in a substantially horizontal direction, and supplemental cutting sections carried by the cutting bar so as to extend between each of the aforesaid sections and in advance of the same, said sections and blades lying in forwardly converging planes.

2. An earth cutting blade comprising an inclined cutting bar, knife sections forming the lower edge of the cutting bar and extending outwardly therefrom in a substantially horizontal direction, blocks mounted upon the cutting bar intermediate of each pair of knife sections, supporting bars extending forwardly therefrom in a downwardly inclined direction, and a knife section secured to the forward end of each supporting bar and located above and intermediate of the aforesaid knife sections and in advance of the same.

3. An earth cutting blade comprising an inclined cutting bar, knife sections forming the lower edge of the cutting bar and extending outwardly therefrom in a substantially horizontal direction, blocks mounted upon the cutting bar intermediate of each pair of knife sections, supporting bars extending forwardly therefrom in a downwardly inclined direction, a knife section secured to the forward end of each supporting bar and located above and intermediate of the aforesaid knife sections and in advance of the same, and a rearwardly inclined cutting knife extending upwardly from each end of the cutting bar.

AUGUST HEMME.

Witnesses:
 GLADYS SEIGLEY,
 M. EGAN.